US010218830B1

(12) United States Patent
Liu et al.

(10) Patent No.: US 10,218,830 B1
(45) Date of Patent: Feb. 26, 2019

(54) DECORATION COMPONENT, HOUSING COMPONENT AND MOBILE TERMINAL HAVING SAME

(71) Applicant: GUANGDONG OPPO MOBILE TELECOMMUNICATIONS CORP., LTD., Dongguan, Guangdong (CN)

(72) Inventors: Miao Liu, Guangdong (CN); Changzhi Li, Guangdong (CN); Houhui Yu, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/037,690

(22) Filed: Jul. 17, 2018

(30) Foreign Application Priority Data

Aug. 28, 2017 (CN) .......................... 2017 1 0752691
Aug. 28, 2017 (CN) ...................... 2017 2 1093717 U

(51) Int. Cl.
*H04M 1/02* (2006.01)

(52) U.S. Cl.
CPC ....... *H04M 1/0283* (2013.01); *H04M 1/0264* (2013.01)

(58) Field of Classification Search
CPC .......................... H04M 1/0283; H04M 1/0264
See application file for complete search history.

(56) References Cited

U.S. PATENT DOCUMENTS

| 8,023,040 | B2 * | 9/2011 | Zhou | H04M 1/0264 348/376 |
| 10,003,371 | B1 * | 6/2018 | Given | H04B 1/3888 |
| 10,051,201 | B1 * | 8/2018 | Wang | G02B 13/001 |
| 2004/0041911 | A1 * | 3/2004 | Odagiri | G06F 1/1632 348/207.1 |
| 2006/0196946 | A1 * | 9/2006 | Tsai | H04M 1/0264 235/472.01 |
| 2006/0261257 | A1 * | 11/2006 | Hwang | H04M 1/0264 250/216 |
| 2007/0242948 | A1 * | 10/2007 | Miramontes | G03B 17/00 396/448 |
| 2010/0230308 | A1 * | 9/2010 | Liu | G03B 17/02 206/320 |
| 2011/0312394 | A1 * | 12/2011 | Jeon | A45C 11/00 455/575.8 |
| 2013/0044382 | A1 * | 2/2013 | Phoon | H04N 5/2253 359/824 |

(Continued)

*Primary Examiner* — Babar Sarwar
(74) *Attorney, Agent, or Firm* — Lathrop Gage LLP

(57) ABSTRACT

The present disclosure provides a decoration component. The decoration component includes a first decoration enclosure, a second decoration enclosure, and a cover. The first decoration enclosure has a first through-hole and a receiving groove surrounding the first through-hole. The second decoration enclosure is received in the receiving groove and protrudes beyond the receiving groove in an axial direction of the first through-hole, and the second decoration enclosure has a second through-hole corresponding to the first through-hole. The cover is coupled at a side of the second decoration enclosure facing away from the first decoration enclosure, and the cover covers the second through-hole. The present disclosure further provides a housing component and a mobile terminal.

12 Claims, 7 Drawing Sheets

(56) References Cited

U.S. PATENT DOCUMENTS

| | | | |
|---|---|---|---|
| 2014/0028258 A1* | 1/2014 | Wen | H04M 1/0262 |
| | | | 320/114 |
| 2014/0045557 A1* | 2/2014 | Chung | H04M 1/0249 |
| | | | 455/575.1 |
| 2014/0077753 A1* | 3/2014 | Wen | H04M 1/0262 |
| | | | 320/103 |
| 2014/0146204 A1* | 5/2014 | Boss | H04N 5/23229 |
| | | | 348/239 |
| 2014/0324596 A1* | 10/2014 | Rodriguez | H04N 5/235 |
| | | | 705/14.66 |
| 2016/0018720 A1* | 1/2016 | Bachar | G02B 7/08 |
| | | | 359/824 |
| 2016/0044148 A1* | 2/2016 | Pizzo | H04M 1/026 |
| | | | 455/575.8 |
| 2016/0248894 A1* | 8/2016 | Hosoi | H04M 1/03 |
| 2016/0277053 A1* | 9/2016 | Wong Chee | H04B 1/3888 |
| 2016/0381346 A1* | 12/2016 | Hsu | H04N 5/2257 |
| | | | 348/47 |
| 2017/0085764 A1* | 3/2017 | Kim | H04N 5/2258 |
| 2017/0324906 A1* | 11/2017 | Kang | G02B 7/28 |
| 2017/0351164 A1* | 12/2017 | Kim | G03B 17/08 |
| 2018/0083663 A1* | 3/2018 | Yoo | A45F 5/00 |
| 2018/0196219 A1* | 7/2018 | O | G02B 7/00 |
| 2018/0234529 A1* | 8/2018 | Yu | H04M 1/0264 |

* cited by examiner

DECORATION COMPONENT, HOUSING COMPONENT AND MOBILE TERMINAL HAVING SAME

CROSS REFERENCE TO RELATED APPLICATION

The present application claims the benefit of prior Chinese Application Nos. 201710752691.4 and 201721093717.0, filed with the State Intellectual Property Office of P. R. China on Aug. 28, 2017. The entire contents of the before-mentioned patent applications are incorporated by reference as part of the disclosure of this U.S. application.

FIELD

The present disclosure relates to a technical field of electronic equipment, and particularly, to a decoration component, a housing component and a mobile terminal.

BACKGROUND

It is usually required to perforate a back cover of a mobile phone and provide an outward protrusion on the back cover by punching. A camera module is arranged corresponding to the protrusion, and a camera head stretches into the protrusion, such that the camera module is accommodated and the overall thickness of the mobile phone is relatively small. However, because of the need to provide the protrusion on the back cover by punching, the structure of the back cover is complicated, and the manufacturing yield of the back cover is low.

SUMMARY

Embodiments of the present disclosure provide a decoration component, a housing component and a mobile terminal having the same.

The decoration component for the mobile terminal according to embodiments of the present disclosure includes: a first decoration enclosure having a first through-hole and a receiving groove surrounding the first through-hole; a second decoration enclosure being received in the receiving groove and protruding beyond the receiving groove in an axial direction of the first through-hole, and having a second through-hole corresponding to the first through-hole; and a cover being coupled at a side of the second decoration enclosure facing away from the first decoration enclosure, the cover covering the second through-hole.

The housing component for the mobile terminal according to embodiments of the present disclosure includes: a housing having a through hole and a mounting groove surrounding the through hole; a first decoration enclosure being received in the mounting groove and protruding beyond the mounting groove in an axial direction of the through hole, the first decoration enclosure being having a first through-hole corresponding to the through hole; and a second decoration enclosure being coupled to the first decoration enclosure and having a second through-hole corresponding to the first through-hole.

The mobile terminal according to embodiments of the present disclosure includes: a housing having a through hole and a mounting groove surrounding the through hole; a first decoration enclosure being arranged in the mounting groove and protruding beyond the mounting groove in an axial direction of the through hole, the first decoration enclosure having a first through-hole aligned with the through hole; a second decoration enclosure being coupled to the first decoration enclosure and having a second through-hole aligned with the first through-hole; and a camera module being arranged in the through hole and having an optical axis coinciding with an axis of the through hole.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings.

DETAILED DESCRIPTION

Figure 1:
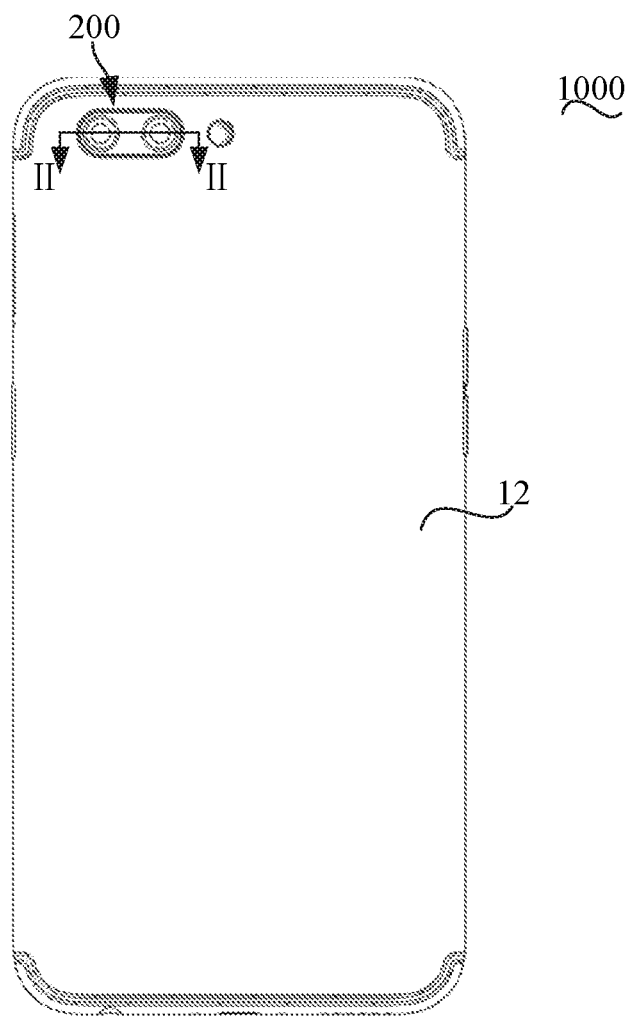
FIG. 1 is a plan view of a mobile terminal according to an embodiment of the present disclosure.

Embodiments of the present disclosure will be further elaborated with reference to accompanying drawings. The same or similar elements and the elements having same or similar functions are denoted by like reference numerals throughout the descriptions.

Additionally, the embodiments described herein with reference to the drawings are illustrative, and only used to understand the embodiments of the present disclosure. The embodiments shall not be construed to limit the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are contacted via an intervening structure. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Figure 2:
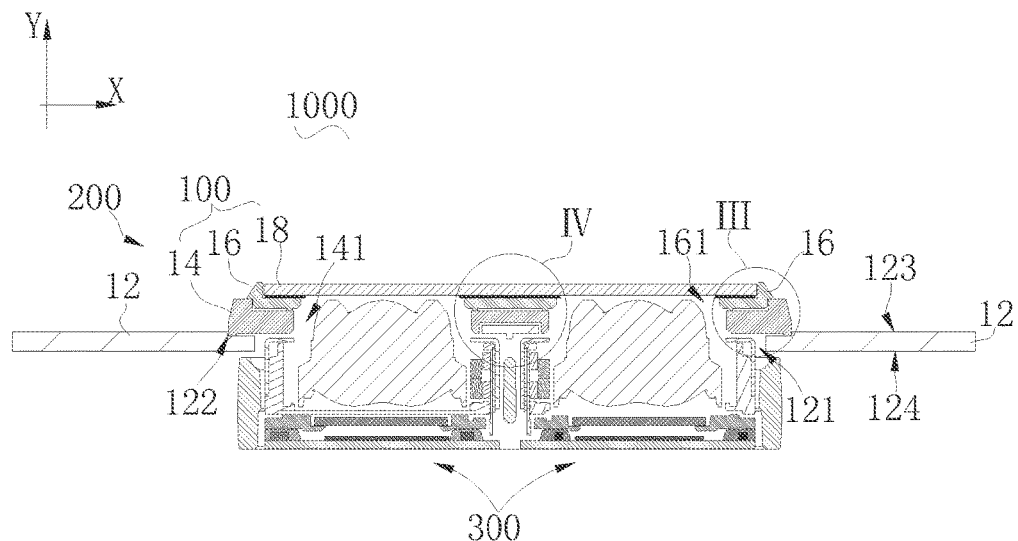
FIG. 2 is a sectional view of the mobile terminal in FIG. 1 taken along line II-II.

As illustrated in FIGS. 1 and 2, a mobile terminal 1000 according to embodiments of the present disclosure may be a mobile phone, a tablet computer, a smart watch, a head-display device, or other electronic equipment having a photographing function. The mobile terminal 1000 configured as a mobile phone is taken as an example for the following descriptions. The mobile terminal 1000 includes a housing component 200 and a camera module 300.

The housing component 200 according to embodiments of the present disclosure includes a housing 12, a first decoration enclosure 14, and a second decoration enclosure 16. The housing 12 has a through hole 121 and a mounting groove 122 surrounding the through hole 121. The first decoration enclosure 14 is coupled in the mounting groove 122 and protrudes beyond the mounting groove 122 in an axial direction of the through hole 121 (Y direction as illustrated in FIG. 2). The first decoration enclosure 14 has a first through-hole 141, and the first through-hole 141 is corresponding to the through hole 121. That is, the first through-hole 141 is aligned with the through hole 121. In some embodiments of the present disclosure, an axis of the first through-hole 141 coincides with an axis of the through hole 121. The second decoration enclosure 16 is coupled to the first decoration enclosure 14, and the second decoration enclosure 16 has a second through-hole 161 corresponding to the through hole 121. That is, the second through-hole 161 is aligned with the through hole 121. In some embodiments of the present disclosure, an axis of the second through-hole 161 coincides with the axis of the through hole 121.

The camera module 300 is arranged corresponding to the through hole 121. In some embodiments of the present disclosure, the camera module 300 run through the through hole 121, and an optical axis of the camera module 300 coincides with the axis of the through hole 121.

The mobile terminal 1000 according to embodiments of the present disclosure provides a protruding structure outside the housing 12 by means of the first decoration enclosure 14 and the second decoration enclosure 16, and avoids directly punching the housing 12 to provide an outward protrusion. On one hand, the structure of the housing 12 becomes simple while the mobile terminal 1000 still has a function of the original protrusion; on the other hand, it is possible to avoid defects such as cracks or wrinkles caused by punching, and hence improve a manufacturing yield.

As illustrated in FIGS. 1 and 2, the mobile terminal 1000 according to embodiments of the present disclosure includes the housing component 200 and the camera module 300. The housing component 200 includes the housing 12, the first decoration enclosure 14, and the second decoration enclosure 16.

The housing 12 can be a back cover of the mobile terminal 1000, for example, a battery cover of the mobile phone. In such a case, correspondingly, the camera module 300 can be a rear camera module of the mobile terminal 1000 and used to video and shoot scenes.

Figure 3:
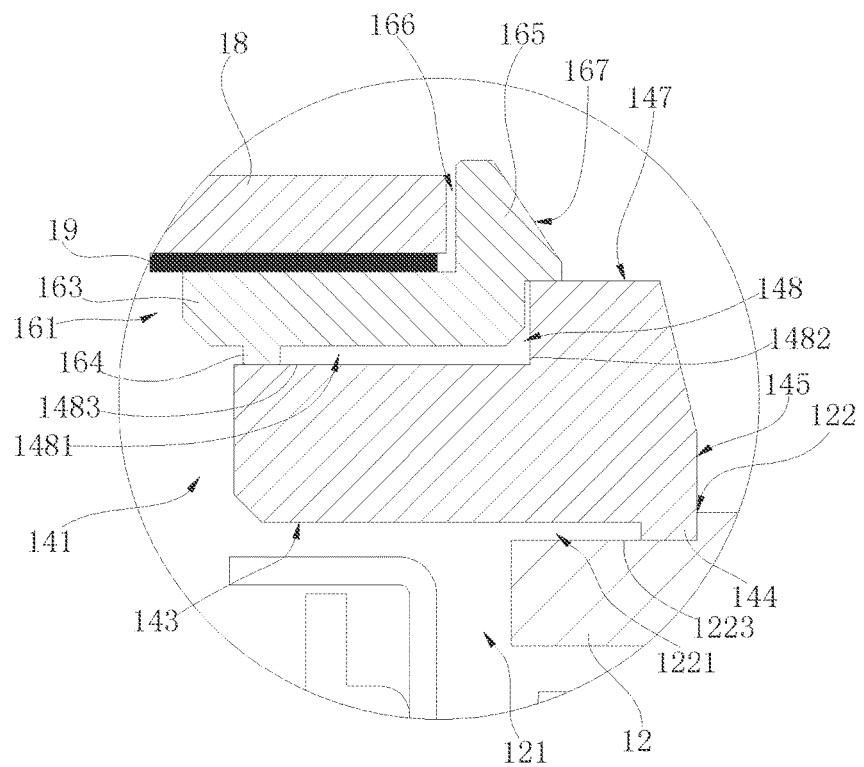
FIG. 3 is an enlarged view of part III in FIG. 2.

As illustrated in FIGS. 2 and 3, the housing 12 includes an outer surface 123 and an inner surface 124. The outer surface 123 serves as a part of an appearance of the mobile terminal 1000, and the inner surface 124 is a surface facing away from the outer surface 123. The housing 12 also has the through hole 121 and the mounting groove 122 surrounding the through hole 121. The through hole 121 runs through the outer surface 123 and the inner surface 124, and the through hole 121 can be circular, square or in other shapes. The mounting groove 122 is provided in the outer surface 123, and the mounting groove 122 does not penetrate the inner surface 124. The mounting groove 122 can be a continuous groove surrounding the through hole 121, or include a plurality of discontinuous grooves distributed around the through hole 121 and spaced apart from one another. A material of the housing 12 may be aluminum alloy, so as to ensure that the housing 12 has good plasticity and strength, and also to facilitate lightweight of the mobile terminal 1000. Certainly, the material of the housing 12 may also include plastic, resin or other non-metallic materials.

As illustrated in FIGS. 2 and 3, the first decoration enclosure 14 has the first through-hole 141, and the first through-hole 141 is corresponding to the through hole 121. The first decoration enclosure 14 can exhibit a ring shape, such as a circular ring shape, an elliptical ring shape, or a runway-like ring shape. The first decoration enclosure 14 is coupled in the mounting groove 122 of the housing 12 and protrudes beyond the mounting groove 122 in the axial direction of the through hole 121 (Y direction as illustrated in FIG. 2). The first decoration enclosure 14 can be connected with the housing 12 by welding or adhering. In some embodiments of the present disclosure, a part of the first decoration enclosure 14 is located in the mounting groove 122, and the other part of the first decoration enclosure 14 is located outside the mounting groove 122. The part of the first decoration enclosure 14 located in the mounting groove 122 is fitted with the mounting groove 122, and the mounting groove 122 has a position limiting effect on the first decoration enclosure 14, so as to prevent the first decoration enclosure 14 from moving, under an external force, in a plane perpendicular to an axis of the through hole 121 (X direction as illustrated in FIG. 2). In some embodiments of the present disclosure, when the through hole 121 is a circular hole, the mounting groove 122 can prevent the first decoration enclosure 14 from moving along a radial direction of the through hole 121 under the action of the external force.

The other part of the first decoration enclosure 14 located outside the mounting groove 122 can be used to decorate the mobile terminal 1000, and for example, can be coated or sputtered with a fluorescent material to improve aesthetics of the mobile terminal 1000. A material of the first decoration enclosure 14 can be consistent with that of the housing 12, such that in a manufacturing process, appearances of the first decoration enclosure 14 and the housing 12 can be treated in the same way, and when the first decoration enclosure 14 is coupled to the housing 12, the appearance of the first decoration enclosure 14 is highly consistent with that of the housing 12. In some embodiments of the present disclosure, the first decoration enclosure 14 may also be made of aluminum alloy, such that the first decoration enclosure 14 is easy to form. Additionally, since the first decoration enclosure 14 protrudes beyond the mounting groove 122 in the axial direction of the through hole 121, the first decoration enclosure 14 actually provides more space for an arrangement of the camera module 300 in the axial direction (Y direction), such that the camera module 300 can pass through the through hole 121 without increasing a thickness of the mobile terminal 1000 in other positions, thus facilitating a lightweight and a thin thickness of the mobile terminal 1000. The second decoration enclosure 16 is coupled to the first decoration enclosure 14, and the second decoration enclosure 16 has the second through-hole 161 corresponding to the through hole 121. The second decoration enclosure 16 as a whole may also exhibit a ring shape, and the second decoration enclosure 16 has the same shape with that of the first decoration enclosure 14 overall, such as a circular ring shape, an elliptical ring shape, a runway-like ring shape, or the like.

As illustrated in FIG. 2, the camera module 300 is arranged corresponding to the through hole 121. In some embodiments of the present disclosure, the camera module 300 is aligned with the through hole 121. In some embodiments of the present disclosure, the optical axis of the camera module 300 coincides with the axis of the through hole 121. The camera module 300 can protrude beyond the outer surface 123 of the housing 12 and extends into the second through-hole 161, such that more space are provided for the arrangement of the camera module 300 in the axial direction (Y direction). Moreover, since the camera module 300 is arranged corresponding to the through hole 121, the through hole 121 is corresponding to the first through-hole 141, and the through hole 121 is corresponding to the second through-hole 161, the camera module 300 is arranged corresponding to all of the through hole 121, the first through-hole 141 and the second through-hole 161. The camera module 300 can receive external lights to generate an image, and the image can be a picture or a video.

The mobile terminal 1000 according to embodiments of the present disclosure provides the protruding structure outside the housing 12 by means of the first decoration enclosure 14 and the second decoration enclosure 16, and avoids directly punching the housing 12 to provide the outward protrusion. On one hand, the structure of the housing 12 becomes simple while the mobile terminal 1000 still has the function of the original protrusion; on the other hand, it is possible to avoid defects such as cracks or wrinkles caused by punching, and also to improve the manufacturing yield.

In some embodiments, a single through hole 121, a single first through-holes 141, and a single second through-holes 161 are provided.

Correspondingly, there is a single camera in the camera module 300. The single camera passes through the through hole 121 and the first through-hole 141 successively, and passes into the second through-hole 161.

Figure 4:
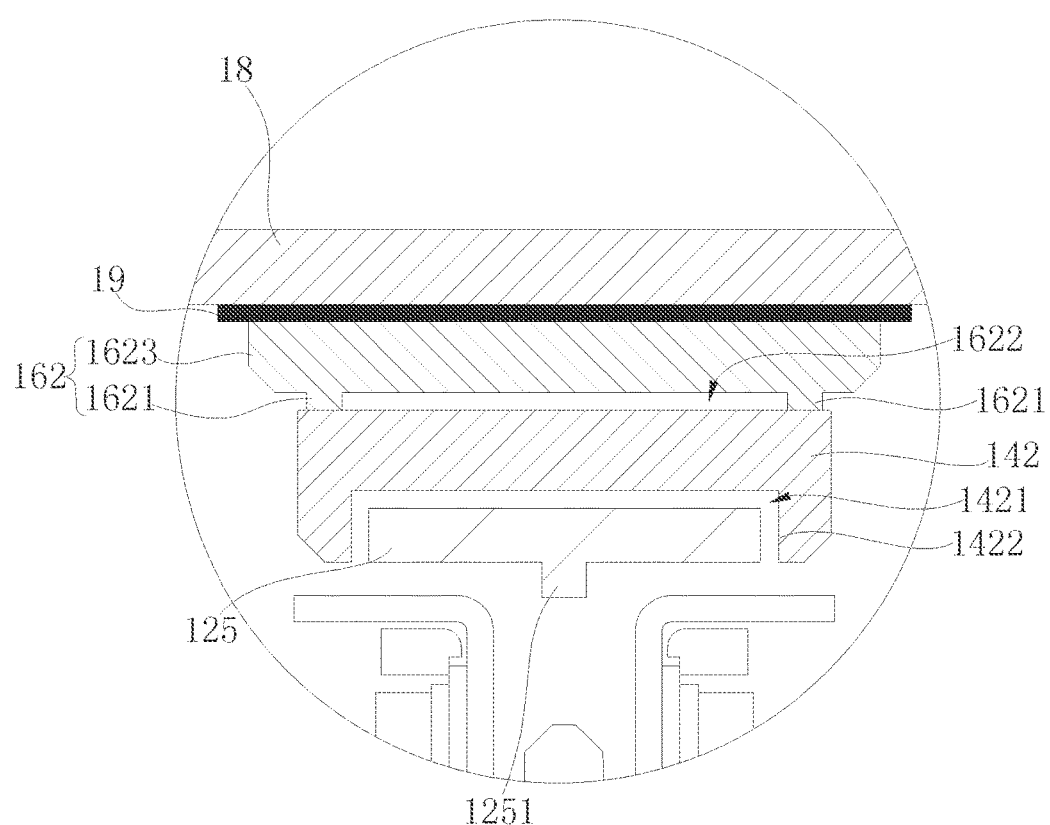
FIG. 4 is an enlarged view of part IV in FIG. 2.

As illustrated in FIGS. 2 and 4, in some embodiments, two through holes 121, two first through-holes 141, and two second through-holes 161 are provided. The housing 12 further includes a reinforcing plate 125 that separates the two through holes 121, and the first decoration enclosure 14 rests against the reinforcing plate 125.

The first decoration enclosure 14 rests against the mounting groove 122, and also abuts against the reinforcing plate 125, such that a coupling area between the first decoration enclosure 14 and the housing 12 is relatively large, thereby enhancing reliability of the coupling between the first decoration enclosure 14 and the housing 12. Furthermore, the reinforcing plate 125 is provided with a reinforcing rib 1251, and the reinforcing rib 1251 further improves the strength of the reinforcing plate 125, so as to avoid deformation and damages of the reinforcing plate 125.

Figure 6:
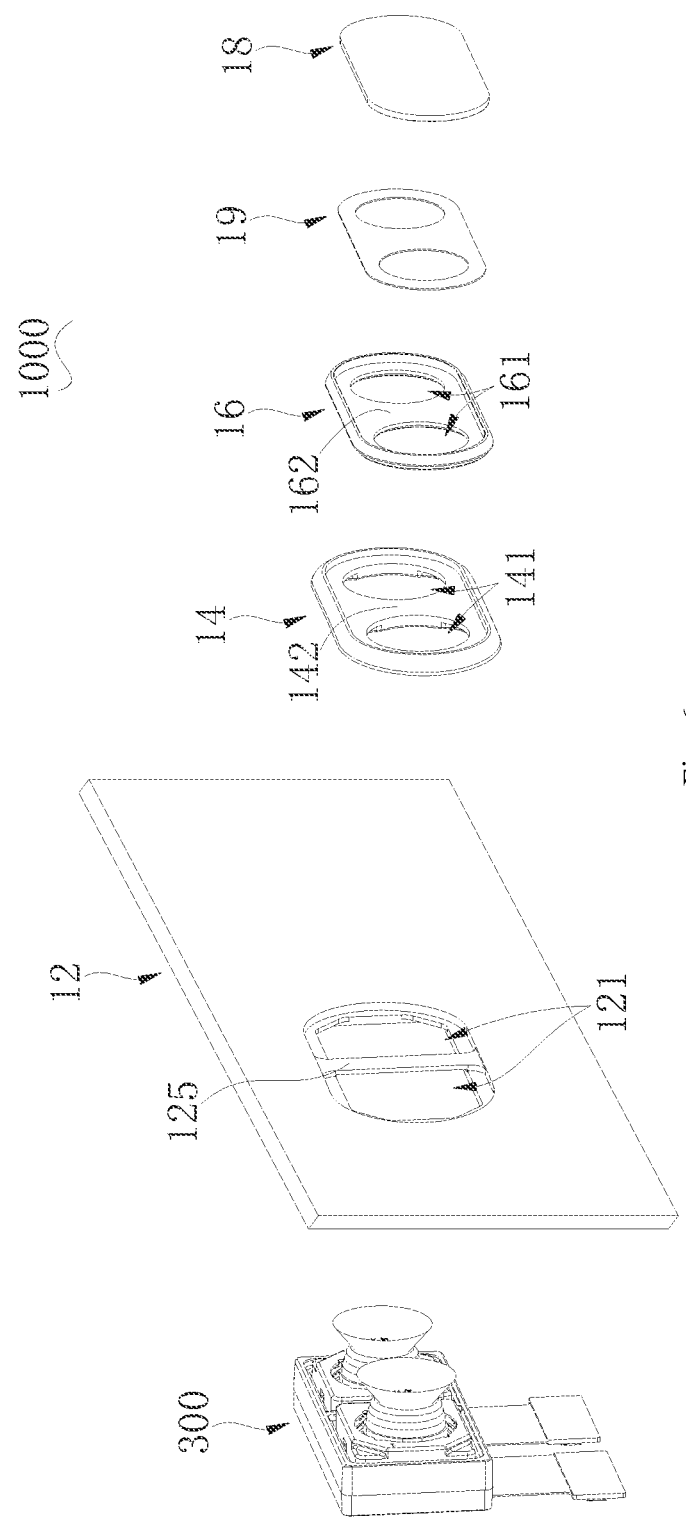
FIG. 6 is an exploded perspective view of a mobile terminal according to embodiments of the present disclosure.

As illustrated in FIG. 6, the two through holes 121 can have the same size and shape. For example, the two through holes 121 are each circular, square, triangular or the like, such that molds for manufacturing the two through holes 121 can be the same, thereby saving manufacturing costs. Certainly, the sizes and shapes of the two through holes 121 can also be not exactly the same, based on practical requirements. For example, when the camera modules 300 corresponding to the two through holes 121 have different sizes, the sizes of the two through holes 121 may also be inconsistent in order to adapt to the size difference of the camera modules 300. Similarly, the sizes and shapes of the two first through-holes 141 and the two second through-holes 161 can be selected in a similar way as the two through holes 121, which will not be elaborated herein.

Correspondingly, two camera modules 300 may be provided, and each camera module 300 is arranged corresponding to one through hole 121. In some embodiments of the present disclosure, the optical axis of each camera module 300 coincides with the axis of the corresponding one through hole 121. The two camera modules 300 can be controlled by a processor of the mobile terminal 1000, so as to offer better user experience.

In some embodiments of the present disclosure, in one example, the two camera modules 300 can implement imaging simultaneously to optimize imaging quality. For example, the two camera modules 300 implement imaging simultaneously to obtain a plurality of frames of first images and a plurality of frames of second images. The processor of the mobile terminal 1000 can analyze the plurality of frames of first images and the plurality of frames of second images, so as to select a frame of image with the best imaging quality as the final image. Alternatively, the processor merges or splices the first image and the second image to enhance the color or the sharpness of the final image.

In another example, one camera module 300 can be used to assist in imaging of the other camera module 300, so as to optimize the imaging quality. For example, one camera module 300 first detects brightness of a current scene, and the processor analyzes a detected brightness value to control an exposure time of a corresponding photosensitive element for each pixel in the other camera module 300, so as to obtain an image with suitable brightness. Thus, it can be ensured that the finally obtained image will not have a problem of overexposure or low brightness, and the quality of the image obtained by the camera module 300 is improved.

In still another example, the two camera modules 300 can be turned on successively for imaging, so as to optimize the imaging quality. For example, one camera module 300 uses a wide-angle lens, and the other camera module 300 uses a telephoto lens. When imaging is required, the camera module 300 using the wide-angle lens is first turned on for imaging; once the mobile terminal 1000 detects that the user performs a zoom-in operation for a preview screen, and a ratio of enlargement exceeds a preset value, the camera module 300 using the telephoto lens is immediately turned on for imaging. In this way, since the wide-angle lens has a large field of view and a short focal length while the telephoto lens has a small field of view and a large focal length, when the user performs the zoom-in operation for the preview screen, it indicates that the user wants to capture a distant scene, and a clear distant scene can only be captured when the telephoto lens is used, in which case, the camera module 300 using the telephoto lens is switched on to perform imaging, so as to improve the sharpness of the captured image.

As illustrated in FIGS. 2 and 4, in some embodiments, the first decoration enclosure 14 includes a first partition plate 142, the first partition plate 142 separates the two first through-holes 141, and the first partition plate 142 is coupled with the reinforcing plate 125. The second decoration enclosure 16 includes a second partition plate 162, the second partition plate 162 separates the two second through-holes 161, and the second partition plate 162 is coupled with the first partition plate 142.

The first partition plate 142 enhances the strength of the first decoration enclosure 14, and the second partition plate 162 enhances the strength of the second decoration enclosure 16, such that the overall structure of the housing component 200 becomes more stable. The first partition plate 142 and the reinforcing plate 125, as well as the second partition plate 162 and the first partition plate 142 can be firmly connected by gluing, snapping, welding or the like. The first partition plate 142 may not be firmly connected to the reinforcing plate 125, and the first partition plate 142 may be directly supported on the reinforcing plate 125. The second partition plate 162 may not be firmly connected to the first partition plate 142, and the second partition plate 162 may be directly supported on the first partition plate 142.

In an embodiment shown in FIGS. 2 and 4, the first partition plate 142 is connected with the reinforcing plate 125 by gluing. In some embodiments of the present disclosure, the reinforcing plate 125 exhibits a flat plate shape, and the first partition plate 142 defines a coupling groove 1421. When the first partition plate 142 needs to be connected with the reinforcing plate 125, glue is dispensed on the reinforcing plate 125, and the reinforcing plate 125 is aligned with and mounted into the coupling groove 1421, such that the reinforcing plate 125 is partially arranged in the coupling groove 1421. After the glue is solidified, the first partition plate 142 and the reinforcing plate 125 are firmly connected. Meanwhile, when the first partition plate 142 and the reinforcing plate 125 are firmly connected, the reinforcing plate 125 is enclosed by side walls 1422 surrounding the coupling groove 1421, the side walls 1422 restrict the reinforcing plate 125 from shaking left and right, and hence a relative position between the first decoration enclosure 14 and the housing 12 is relatively stable. In other embodiments, the reinforcing plate 125 can be completely received in the coupling groove 1421.

In the embodiment shown in FIGS. 2 and 4, the second partition plate 162 and the first partition plate 142 are connected by gluing. In some embodiments of the present disclosure, the second partition plate 162 includes a body 1623 and a coupling protrusion 1621 provided on the body 1623. The coupling protrusion 1621 abuts against the first partition plate 142, and a glue receiving space 1622 is defined by the body 1623, the coupling protrusion 1621 and the first partition plate 142. When the first partition plate 142 and the second partition plate 162 are firmly connected, the first partition plate 142 can be first dispensed with glue, then the coupling protrusion 1621 rests against the first partition plate 142, and the glue is received in the glue receiving space 1622. After the glue is solidified, the first partition plate 142 is firmly connected with the second partition plate 162.

As illustrated in FIGS. 2 and 3, in some embodiments, the first decoration enclosure 14 includes a bottom surface 143 and a mounting protrusion 144 protruding from the bottom surface 143. The bottom surface 143 is a surface of the first decoration enclosure 14 away from the second decoration enclosure 16, and the mounting protrusion 144 abuts against a bottom 1223 of the mounting groove 122 to define a gap 1221 between the bottom surface 143 and the bottom 1223 of the mounting groove 122.

The gap 1221 can be used to receive glue so that the glue can firmly connect the first decoration enclosure 14 with the housing 12. In some embodiments of the present disclosure, the mounting protrusion 144 can be a continuous ring-shaped protrusion, and the mounting protrusion 144 can also include a plurality of sub-protrusions spaced apart from one another. During the mounting of the first decoration enclosure 14, the glue can be dispensed in the mounting groove 122, then the mounting protrusion 144 abuts against the bottom 1223 of the mounting groove 122, and hence the glue is received in the gap 1221. After the glue is solidified, the first decoration enclosure 14 and the housing 12 are firmly connected.

As illustrated in FIGS. 2 and 3, in some embodiments, the mounting protrusion 144 of the first decoration enclosure 14 abuts against a side wall of the mounting groove 122 to block foreign substances from entering the through hole 121 through the mounting groove 122.

In some embodiments of the present disclosure, the mounting protrusion 144 can exhibit a ring shape, the ring-shaped mounting protrusion 144 abuts against the side wall of the mounting groove 122, and the mounting protrusion 144 separates the gap 1221 from the outside and blocks the foreign substances (water vapor, dust, etc.) from entering the mounting groove 122, thereby preventing the foreign substances from contaminating the camera module 300 and affecting the imaging quality.

Figure 5:
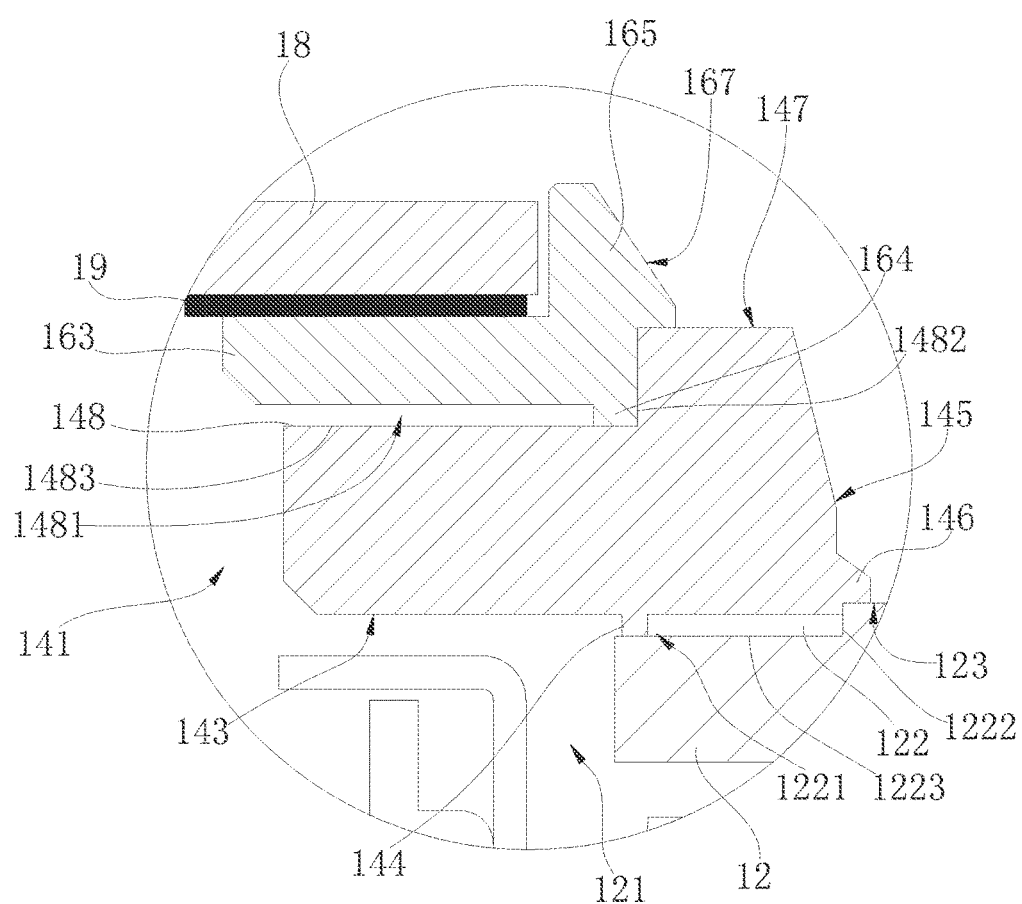
FIG. 5 is a partially enlarged view of a section of a housing component according to embodiments of the present disclosure.

As illustrated in FIG. 5, in some embodiments, the housing 12 includes the outer surface 123 and the inner surface 124. The through hole 121 runs through the outer surface 123 and the inner surface 124 of the housing 12. The outer surface 123 of the housing 12 is closer to the second decoration enclosure 16 than the inner surface 124 of the housing 12. The first decoration enclosure 14 further includes a sealing protrusion 146, the sealing protrusion 146 extends from an outer peripheral surface 145 of the first decoration enclosure 14, and the sealing protrusion 146 abuts against the outer surface 123 of the housing 12.

In some embodiments of the present disclosure, the outer peripheral surface 145 of the first decoration enclosure 14 is a part of an appearance surface of the mobile terminal 1000 which can be seen by the user. The outer peripheral surface 145 of the first decoration enclosure 14 may have the same color with that of the outer surface 123 of the housing 12, such that the appearance of the first decoration enclosure 14 is highly consistent with that of the housing 12. The sealing protrusion 146 abuts against the outer surface 123 of the housing 12, enlarging the coupling area between the first decoration enclosure 14 and the housing 12, such that the first decoration enclosure 14 and the housing 12 have great coupling stability, and the sealing protrusion 146 is able to prevent the foreign substances from entering the mounting groove 122.

In this case, the mounting protrusion 144 of the first decoration enclosure 14 can be spaced apart from a side wall 1222 of the mounting groove 122, and hence separate the gap 1221 from the through hole 121. The gap 1221 can be used to receive the glue when the first decoration enclosure 14 and the housing 12 are glued together, and the mounting protrusion 144 of the first decoration enclosure 14 prevents the glue from flowing into the through hole 121. In one example, the mounting protrusion 144 of the first decoration enclosure 14 is in contact with a wall surrounding the through hole 121 to increase a size of the gap 1221 as much as possible, thereby increasing the amount of glue received in the gap 1221, so that the first decoration enclosure 14 and the housing 12 are coupled more firmly.

Certainly, in other embodiments, the first decoration enclosure 14 may not be provided with the mounting protrusion 144, and when the first decoration enclosure 14 is coupled to the housing 12, the bottom surface 143 of the first decoration enclosure 14 directly rests against the bottom 1223 of the mounting groove 122.

As illustrated in FIGS. 2 and 3, the first decoration enclosure 14 includes a top surface 147 and a receiving groove 148 defined in the top surface 147, and the top surface 147 is a surface of the first decoration enclosure 14 away from the housing 12. The second decoration enclosure 16 is received in the receiving groove 148 and protrudes beyond the receiving groove 148 in an axial direction of the first through-hole 141 (Y direction as illustrated in FIG. 2).

A part of the second decoration enclosure 16 located in the receiving groove 148 is fitted with the receiving groove 148, and the receiving groove 148 has a position limiting effect on the second decoration enclosure 16, so as to prevent the second decoration enclosure 16 from moving, under an external force, in a plane perpendicular to an axis of the first through-hole 141 (X direction as illustrated in FIG. 2). In some embodiments of the present disclosure, when the first through-hole 141 is a circular hole, the receiving groove 148 can restrict the second decoration enclosure 16 from moving along a radial direction of the first through-hole 141 under the action of the external force. The other part of the second decoration enclosure 16 located outside the receiving groove 148 can serve to decorate the mobile terminal 1000, and for example, can be coated or sputtered with a fluorescent material to improve the aesthetics of the mobile terminal 1000. A material of the second decoration enclosure 16 can be consistent with that of the first decoration enclosure 14, such that in the manufacturing process, the appearances of the second decoration enclosure 16 and the first decoration enclosure 14 can be treated in the same way, and when the second decoration enclosure 16 is coupled to the first decoration enclosure 14, the appearance of the second decoration enclosure 16 is highly consistent with that of the first decoration enclosure 14. In some embodiments of the present disclosure, the second decoration enclosure 16 may be made of an aluminum alloy material or a stainless steel material, such that the second decoration enclosure 16 is easy to form and provides great strength.

As illustrated in FIGS. 2 and 3, in some embodiments, the second decoration enclosure 16 includes a base ring 163 and a connecting protrusion 164. The base ring 163 is received in the receiving groove 148. The connecting protrusion 164 protrudes from the base ring 163 towards a groove bottom 1483 of the receiving groove 148. The connecting protrusion 164 abuts against the groove bottom 1483 of the receiving groove 148, such that a void 1481 is defined by the base ring 163 and the groove bottom 1483 of the receiving groove 148.

The void 1481 can be used to receive glue, such that the glue can firmly connect the second decoration enclosure 16 with the first decoration enclosure 14. In some embodiments of the present disclosure, the connecting protrusion 164 can be a continuous ring-shaped protrusion, or the connecting protrusion 164 may include a plurality of sub-protrusions spaced apart from one another. During the mounting of the second decoration enclosure 16, the glue can be dispensed in the receiving groove 148, then the connecting protrusion 164 abuts against the groove bottom 1483 of the receiving groove 148, and hence the glue is received in the void 1481. After the glue is solidified, the second decoration enclosure 16 and the first decoration enclosure 14 are firmly connected.

As illustrated in FIG. 5, in some embodiments, the connecting protrusion 164 of the second decoration enclosure 16 abuts against a side wall 1482 of the receiving groove 148 to block foreign substances from entering the first through-hole 141 through the receiving groove 148.

In some embodiments of the present disclosure, the connecting protrusion 164 of the second decoration enclosure 16 can exhibit a ring shape, the ring-shaped connecting protrusion 164 abuts against the side wall 1482 of the receiving groove 148, and the connecting protrusion 164 separates the void 1481 from the outside and prevents the foreign substances (water vapor, dust, etc.) from entering the receiving groove 148, thereby avoiding the foreign substances from contaminating the camera module 300 and affecting the imaging quality.

As illustrated in FIGS. 2 and 3, in some embodiments, the second decoration enclosure 16 includes the base ring 163 and a fixing ring 165. The base ring 163 is received in the receiving groove 148. The fixing ring 165 protrudes from the base ring 163 towards the outside of the receiving groove 148, and the fixing ring 165 abuts against the top surface 147.

In some embodiments of the present disclosure, the fixing ring 165 is a structure which can be seen by the user from the appearance of the mobile terminal 1000. The fixing ring 165 may have the same color as the top surface 147, such that the appearance of the second decoration enclosure 16 is highly consistent with that of the first decoration enclosure 14. The fixing ring 165 abuts against the top surface 147, to enlarge a coupling area between the second decoration enclosure 16 and the first decoration enclosure 14, such that the second decoration enclosure 16 and the first decoration enclosure 14 have great coupling stability, and the fixing ring 165 is able to prevent the foreign substances from entering the receiving groove 148.

As illustrated in FIGS. 2 and 3, in some embodiments, the second decoration enclosure 16 further includes the fixing ring 165 protruding from the base ring 163 towards the outside of the receiving groove 148, and the fixing ring 165 abuts against the top surface 147. The connecting protrusion 164 of the second decoration enclosure 16 is used to separate the void 1481 from the first through-hole 141.

In such a case, the connecting protrusion 164 of the second decoration enclosure 16 can be spaced apart from the side wall 1482 of the receiving groove 148, and the connecting protrusion 164 separates the void 1481 from the first through-hole 141. The void 1481 can be used to receive the glue when the second decoration enclosure 16 and the first decoration enclosure 14 are glued together, and the connecting protrusion 164 of the second decoration enclosure 16 prevents the glue from flowing into the first through-hole 141. In one example, the connecting protrusion 164 is in contact with a wall surrounding the first through-hole 141 to increase a size of the void 1481 as much as possible, thereby increasing the amount of glue received in the void 1481, so that the second decoration enclosure 16 and the first decoration enclosure 14 are coupled more firmly.

Certainly, in other embodiments, the second decoration enclosure 16 may not be provided with the connecting protrusion 164, and when the second decoration enclosure 16 is coupled to the first decoration enclosure 14, the base ring 163 directly rests against the groove bottom of the receiving groove 148.

Figure 8:
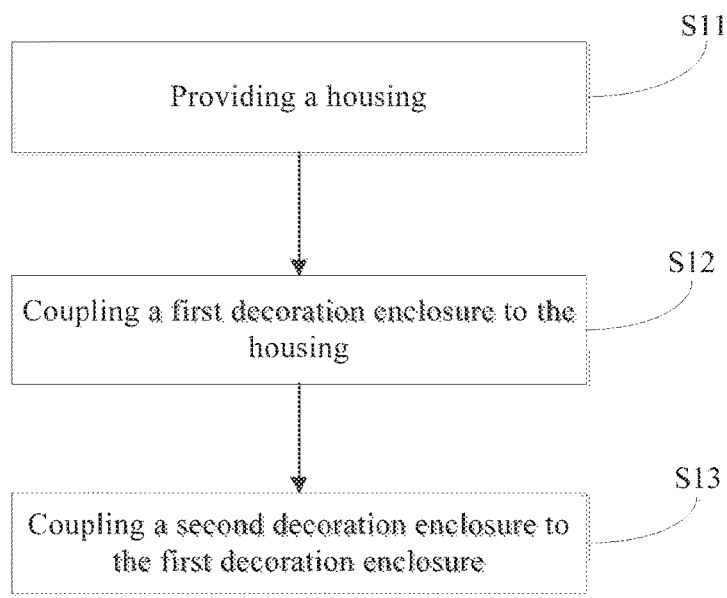
FIG. 8 is a flow chart of an assembling method for a housing component according to embodiments of the present disclosure.

As illustrated in FIG. 8, an assembling method for a housing component 200 according to an embodiment of the present disclosure includes actions in following blocks.

In block S11: a housing 12 is provided, and the housing 12 has a through hole 121 and a mounting groove 122 surrounding the through hole 121.

In block S12: a first decoration enclosure 14 is coupled to the housing 12, the first decoration enclosure 14 is coupled in the mounting groove 122 and protrudes beyond the mounting groove 122 in an axial direction of the through hole 121, and the first decoration enclosure 14 has a first through-hole 141 corresponding to the through hole 121.

In block S13: a second decoration enclosure 16 is coupled to the first decoration enclosure 14, and the second decoration enclosure 16 has a second through-hole 161 corresponding to the first through-hole 141.

As illustrated in FIG. 2, in another embodiment of the present disclosure, the housing component 200 includes the housing 12 and a decoration component 100.

The housing 12 has the through hole 121 and the mounting groove 122 surrounding the through hole 121.

As illustrated in FIG. 2 and FIG. 3, the decoration component 100 includes the first decoration enclosure 14, the second decoration enclosure 16 and a cover 18. The first decoration enclosure 14 has the first through-hole 141 and the receiving groove 148 surrounding the first through-hole 141. The first through-hole 141 is corresponding to the through hole 121, and the first decoration enclosure 14 is coupled in the mounting groove 122 and protrudes beyond the mounting groove 122 in the axial direction of the through hole 121 (Y direction as illustrated in FIG. 2). The second decoration enclosure 16 is received in the receiving groove 148 and protrudes beyond the receiving groove 148 in an axial direction of the first through-hole 141, and the second decoration enclosure 16 has the second through-hole 161 corresponding to the first through-hole 141. That is, the second through-hole 161 is aligned with the first through-hole 141. In some embodiments of the present disclosure, the axis of the second through-hole 161 coincides with the axis of the first through-hole 141. The cover 18 is coupled at a side of the second decoration enclosure 16 facing away from the first decoration enclosure 14, and the cover 18 covers the second through-hole 161.

The housing component 200 according to embodiments of the present disclosure provides a protruding structure outside the housing 12 by means of the first decoration enclosure 14 and the second decoration enclosure 16, and hence avoids directly punching the housing 12 to provide an outward protrusion. On one hand, the structure of the housing 12 becomes simple while the housing component 200 still has a function of the original protrusion; on the other hand, it is possible to avoid defects such as cracks or wrinkles caused by punching, and also to improve a manufacturing yield. In another embodiment, the decoration component 100 can also serve as a decoration component for a fingerprint recognition module.

As illustrated in FIG. 2, the housing component 200 according to embodiments of the present disclosure includes the housing 12 and the decoration component 100. The decoration component 100 includes the first decoration enclosure 14, the second decoration enclosure 16, and the cover 18.

As illustrated in FIGS. 2 and 3, the housing 12 includes the outer surface 123 and the inner surface 124. The outer surface 123 constitutes a part of the appearance of the mobile terminal 1000, and the inner surface 124 is a surface facing away from the outer surface 123. The housing 12 also has the through hole 121 and the mounting groove 122 surrounding the through hole 121. The through hole 121 runs through the outer surface 123 and the inner surface 124, and the through hole 121 can be circular, square or in other shapes. The mounting groove 122 is provided in the outer surface 123, and the mounting groove 122 does not penetrate the inner surface 124. The mounting groove 122 can be a continuous groove surrounding the through hole 121, or include a plurality of discontinuous grooves distributed around the through hole 121 and spaced apart from one another. The material of the housing 12 may be aluminum alloy, so as to ensure that the housing 12 has good plasticity and strength, and also to facilitate the lightweight and the thin thickness of the mobile terminal 1000. Certainly, the material of the housing 12 may also be plastic, resin, or other non-metallic materials.

As illustrated in FIGS. 2 and 3, the first decoration enclosure 14 has the first through-hole 141, and the first through-hole 141 is corresponding to the through hole 121. The first decoration enclosure 14 can exhibit a ring shape, such as a circular ring shape, an elliptical ring shape, a runway-like ring shape. The first decoration enclosure 14 is coupled in the mounting groove 122 of the housing 12 and protrudes beyond the mounting groove 122 in the axial direction of the through hole 121 (Y direction as illustrated in FIG. 2). The first decoration enclosure 14 can be connected with the housing 12 by welding or adhering. In some embodiments of the present disclosure, a part of the first decoration enclosure 14 is located in the mounting groove 122, and the other part of the first decoration enclosure 14 is located outside the mounting groove 122. The part of the first decoration enclosure 14 located in the mounting groove 122 is fitted with the mounting groove 122, and the mounting groove 122 has a position limiting effect on the first decoration enclosure 14, so as to prevent the first decoration enclosure 14 from moving, under an external force, in a plane perpendicular to an axis of the through hole 121 (X direction as illustrated in FIG. 2). In some embodiments of the present disclosure, when the through hole 121 is a circular hole, the mounting groove 122 can restrict the first decoration enclosure 14 from moving along a radial direction of the through hole 121 under the action of the external force.

The other part of the first decoration enclosure 14 located outside the mounting groove 122 can serve to decorate the mobile terminal 1000, and for example, can be coated or sputtered with a fluorescent material to improve the aesthetics of the mobile terminal 1000. The material of the first decoration enclosure 14 can be consistent with that of the housing 12, such that in a manufacturing process, the appearances of the first decoration enclosure 14 and the housing 12 can be treated in the same way, and when the first decoration enclosure 14 is coupled to the housing 12, the appearance of the first decoration enclosure 14 is highly consistent with that of the housing 12. In some embodiments of the present disclosure, the first decoration enclosure 14 may also be made of aluminum alloy, such that the first decoration enclosure 14 is easy to form. Additionally, since the first decoration enclosure 14 protrudes beyond the mounting groove 122 in the axial direction of the through hole 121, the first decoration enclosure 14 actually provides more space for the arrangement of the camera module 300 in the axial direction (Y direction), such that the camera module 300 can pass through the through hole 121 without increasing the thickness of the mobile terminal 1000 in other positions, thus facilitating the lightweight and the thin thickness of the mobile terminal 1000. The second decoration enclosure 16 is coupled to the first decoration enclosure 14, and the second decoration enclosure 16 has the second through-hole 161 corresponding to the through hole 121. The second decoration enclosure 16 as a whole may also exhibit a ring shape, and the second decoration enclosure 16 has the same shape with that of the first decoration enclosure 14 overall, such as a circular ring shape, an elliptical ring shape, a runway-like ring shape, or the like.

As illustrated in FIGS. 2 and 3, a part of the second decoration enclosure 16 located in the receiving groove 148 is fitted with the receiving groove 148, and the receiving groove 148 has a position limiting effect on the second decoration enclosure 16, so as to prevent the second decoration enclosure 16 from moving, under an external force, in a plane perpendicular to an axis of the first through-hole 141 (X direction as illustrated in FIG. 2). In some embodiments of the present disclosure, when the first through-hole 141 is a circular hole, the receiving groove 148 can restrict the second decoration enclosure 16 from moving along a radial direction of the first through-hole 141 under the action of the external force. The other part of the second decoration enclosure 16 located outside the receiving groove 148 can serve to decorate the mobile terminal 1000, and for example, can be coated or sputtered with a fluorescent material to improve the aesthetics of the mobile terminal 1000. The material of the second decoration enclosure 16 can be consistent with that of the first decoration enclosure 14, such that in the manufacturing process, the appearances of the second decoration enclosure 16 and the first decoration enclosure 14 can be treated in the same way, and when the second decoration enclosure 16 is coupled to the first decoration enclosure 14, the appearance of the second decoration enclosure 16 is highly consistent with that of the first decoration enclosure 14. In some embodiments of the present disclosure, the second decoration enclosure 16 may be made of an aluminum alloy material or a stainless steel material, such that the second decoration enclosure 16 is easy to form and provides great strength.

As illustrated in FIGS. 2 and 3, the cover 18 is coupled at the side of the second decoration enclosure 16 facing away from the first decoration enclosure 14. That is, the second decoration enclosure 16 is located between the first decoration enclosure 14 and the cover 18. The cover 18 covers the second through-hole 161, such that light enters the second through-hole 161 after passing through the cover 18, and is further received by the camera module 300. The material of the cover 18 may be a light-transparent material, such as sapphire, glass or resin, so that the cover 18 has a good light transmittance. When the cover 18 is made of sapphire, a surface of the cover 18 does not tend to be scratched.

The housing component 200 according to embodiments of the present disclosure provides the protruding structure outside the housing 12 by means of the first decoration enclosure 14 and the second decoration enclosure 16, and hence avoids directly punching the housing 12 to provide the outward protrusion. On one hand, the structure of the housing 12 becomes simple while the housing component 200 still has the function of the original protrusion; on the other hand, it is possible to avoid defects such as cracks or wrinkles caused by punching, and also to improve the manufacturing yield.

As illustrated in FIGS. 2 and 3, in some embodiments, the second decoration enclosure 16 includes a base ring 163 and a connecting protrusion 164. The base ring 163 is received in the receiving groove 148. The connecting protrusion 164 protrudes from the base ring 163 towards a groove bottom 1483 of the receiving groove 148. The connecting protrusion 164 abuts against the groove bottom 1483 of the receiving groove 148, such that a void 1481 is defined by the base ring 163 and the groove bottom 1483 of the receiving groove 148.

The void 1481 can be used to receive glue, such that the glue can firmly connect the second decoration enclosure 16 with the first decoration enclosure 14. In some embodiments of the present disclosure, the connecting protrusion 164 can be a continuous ring-shaped protrusion, or the connecting protrusion 164 may include a plurality of sub-protrusions spaced apart from one another. During the mounting of the second decoration enclosure 16, the glue can be dispensed in the receiving groove 148, then the connecting protrusion 164 abuts against the groove bottom 1483 of the receiving groove 148, and hence the glue is received in the void 1481. After the glue is solidified, the second decoration enclosure 16 and the first decoration enclosure 14 are firmly connected.

As illustrated in FIGS. 2 and 5, in some embodiments, the connecting protrusion 164 of the second decoration enclosure 16 abuts against a side wall 1482 of the receiving groove 148 to block foreign substances from entering the first through-hole 141 through the receiving groove 148.

In some embodiments of the present disclosure, the connecting protrusion 164 of the second decoration enclosure 16 can exhibit a ring shape, the ring-shaped connecting protrusion 164 abuts against the side wall of the receiving groove 148 and the connecting protrusion 164 separates the void 1481 from the outside and blocks foreign substances (water vapor, dust, etc.) from entering the receiving groove 148, thereby preventing the foreign substances from contaminating the camera module 300 and affecting the imaging quality.

As illustrated in FIGS. 2 and 3, in some embodiments, the second decoration enclosure 16 includes the base ring 163 and the fixing ring 165. The base ring 163 is received in the receiving groove 148. The fixing ring 165 protrudes from the base ring 163 towards the outside of the receiving groove 148, and the fixing ring 165 abuts against the top surface 147.

In some embodiments of the present disclosure, the fixing ring 165 is a structure which can be seen by the user from the appearance of the mobile terminal 1000. The fixing ring 165 may have the same color as the top surface 147, such that the appearance of the second decoration enclosure 16 is consistent with that of the first decoration enclosure 14. The fixing ring 165 abuts against the top surface 147, to enlarge the coupling area between the second decoration enclosure 16 and the first decoration enclosure 14, such that the second decoration enclosure 16 and the first decoration enclosure 14 have great coupling stability, and the fixing ring 165 is able to prevent the foreign substances from entering the receiving groove 148.

As illustrated in FIGS. 2 and 3, in some embodiments, the second decoration enclosure 16 further includes the fixing ring 165 protruding from the base ring 163 towards the outside of the receiving groove 148, and the fixing ring 165 abuts against the top surface 147. The connecting protrusion 164 of the second decoration enclosure 16 is used to separate the void 1481 from the first through-hole 141.

In such a case, the connecting protrusion 164 of the second decoration enclosure 16 can be spaced apart from the side wall 1482 of the receiving groove 148, the connecting protrusion 164 separates the void 1481 from the first through-hole 141, and the void 1481 can be used to receive the glue when the second decoration enclosure 16 and the first decoration enclosure 14 are glued together. The connecting protrusion 164 of the second decoration enclosure 16 prevents the glue from flowing into the first through-hole 141. In one example, the connecting protrusion 164 is in contact with a wall surrounding the first through-hole 141 to increase the size of the void 1481 as much as possible, thereby increasing the amount of glue received in the void 1481, so that the second decoration enclosure 16 and the first decoration enclosure 14 are coupled more firmly.

Certainly, in other embodiments, the second decoration enclosure 16 may not be provided with the connecting protrusion 164, and when the second decoration enclosure 16 is coupled to the first decoration enclosure 14, the base ring 163 directly rests against the groove bottom of the receiving groove 148.

As illustrated in FIGS. 2 and 3, in some embodiments, the outer peripheral surface 145 of the first decoration enclosure 14 is a matte surface, and the outer peripheral surface 167 of the second decoration enclosure 16 is a high glossy surface.

The outer peripheral surface 145 of the first decoration enclosure 14 provides a high glossy effect, while the outer peripheral surface 167 of the second decoration enclosure 16 provides a matte effect. The combination of the first decoration enclosure 14 and the second decoration enclosure 16 can produce a good appearance effect. In some embodiments of the present disclosure, the material of the first decoration enclosure 14 may be aluminum alloy, while the material of the second decoration enclosure 16 may be stainless steel. The high glossy effect of the outer peripheral surface 145 of the first decoration enclosure 14 can be achieved by subjecting the outer peripheral surface 145 of the first decoration enclosure 14 to a electrolytic polishing, a mechanical polishing, or the like. The matte effect of the outer peripheral surface 167 of the second decoration enclosure 16 can be obtained by subjecting the outer peripheral surface 167 of the second decoration enclosure 16 to a chemical matte process, a mechanical matte process, or the like.

As illustrated in FIGS. 2 and 3, in some embodiments, the fixing ring 165 and the base ring 163 together define a fixing groove 166, and the cover 18 is coupled in the fixing groove 166.

In some embodiments of the present disclosure, the cover 18 can be bonded with the fixing groove 166 through a double sided adhesive 19, or the cover 18 can be connected with the fixing groove 166 in a snapping manner. The cover 18 covers the second through-hole 161 and prevents the foreign substances from entering the second through-hole 161 and affecting a normal operation of the camera module 300. An upper surface of the cover 18 can be flush with an upper surface of the fixing ring 165, such that the cover 18 will not be higher than the fixing ring 165, and hence the thickness of the housing component 200 will not be increased; the cover 18 will not be lower than the fixing ring 165, and hence the fixing ring 165 will not protrude and degrade the aesthetics.

Figure 7:
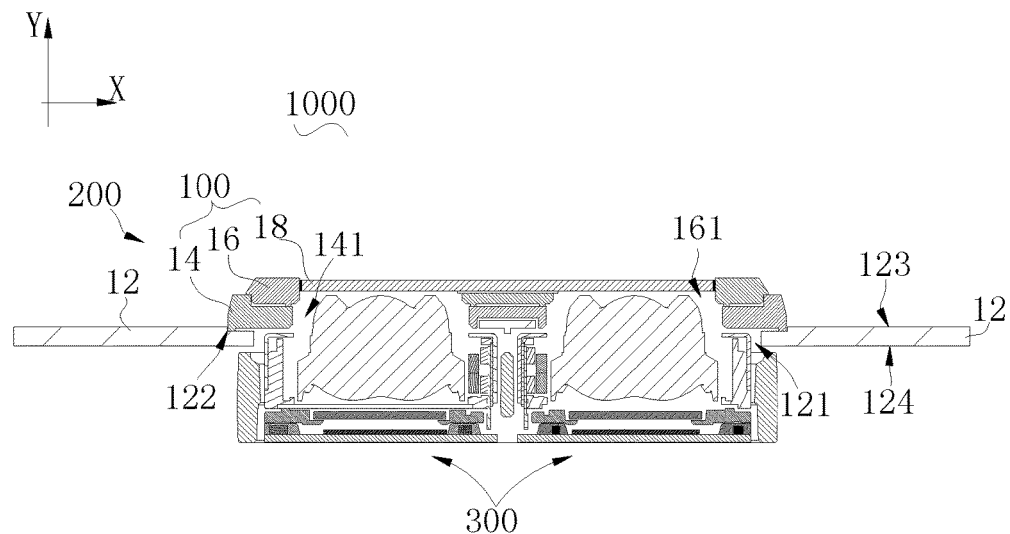
FIG. 7 is a partial sectional view of a mobile terminal according to another embodiment of the present disclosure.

In some embodiments, the cover 18 is received in the second through-hole 161, as illustrated in FIG. 7.

The cover 18 can be embedded in an inner wall of the second through-hole 161 to cover the second through-hole 161, and the light enters the camera module 300 after passing through the cover 18.

Figure 9:
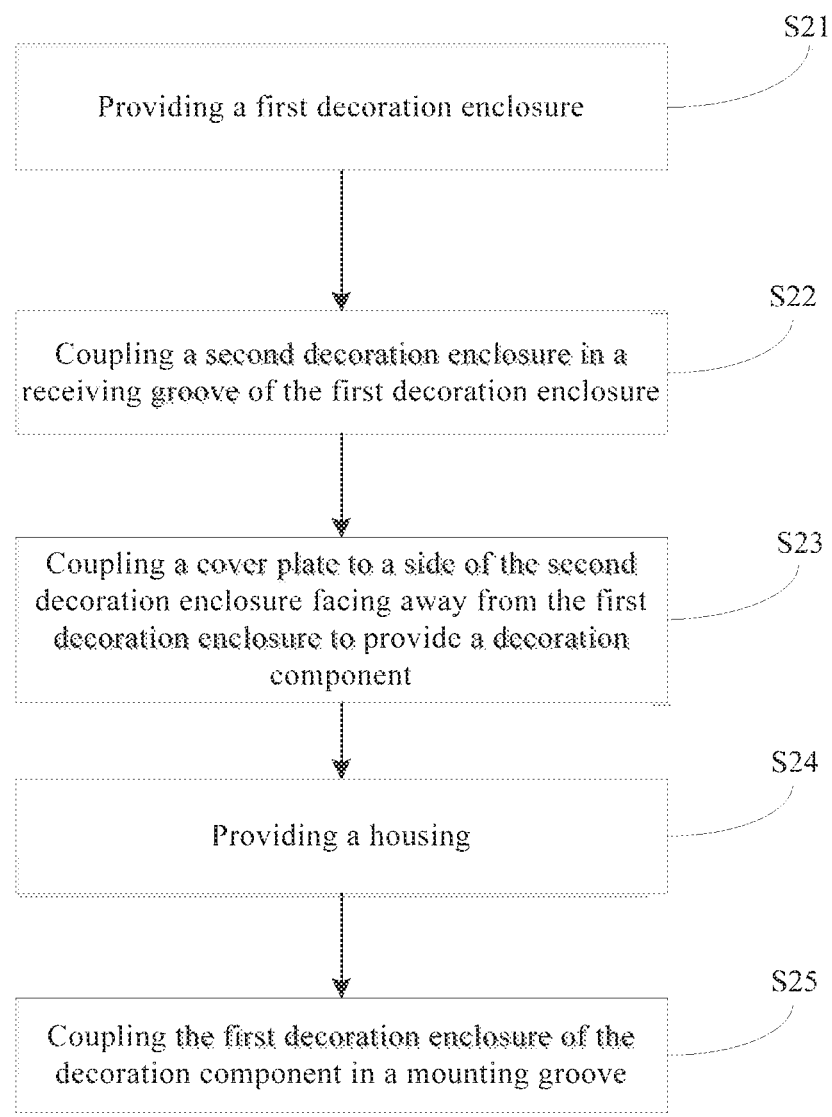
FIG. 9 is a flow chart of an assembling method for a housing component according to embodiments of the present disclosure.

As illustrated in FIG. 9, an assembling method for a housing component 200 according to an embodiment of the present disclosure includes actions in following blocks.

In block S21: a first decoration enclosure 14 is provided, and the first decoration enclosure 14 has a first through-hole 141 and a receiving groove 148 surrounding the first through-hole 141.

In block S22: a second decoration enclosure 16 is received in the receiving groove 148 of the first decoration enclosure 14 in such a way that the second decoration enclosure 16 protrudes beyond the receiving groove 148 in an axial direction of the first through-hole 141, and the second decoration enclosure 16 has a second through-hole 161 corresponding to the first through-hole 141.

In block S23: a cover 18 is coupled at a side of the second decoration enclosure 16 facing away from the first decoration enclosure 14 to provide a decoration component 100, and the cover 18 covers the second through-hole 161.

In block S24: a housing 12 is provided, and the housing 12 has a through hole 121 and a mounting groove 122 surrounding the through hole 121.

In block S25: the first decoration enclosure 14 of the decoration component 100 is received in the mounting groove 122 in such a way that the first decoration enclosure 14 protrudes beyond the mounting groove 122 in an axial direction of the through hole 121, and the through hole 121 is corresponding to the first through-hole 141.

It should be noted that the action in block S23 may be implemented before that in block S22, that is, the cover 18 can be first coupled to the second decoration enclosure 16, and then the second decoration enclosure 16 is coupled to the first decoration enclosure 14.

Reference throughout this specification to "certain embodiments", "one embodiment", "some embodiments", "an illustrative embodiment," "an example", "a specific example" or "some examples" means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

Although embodiments of the present disclosure have been shown and described, it would be appreciated by those skilled in the art that the above embodiments are illustrative and cannot be construed to limit the present disclosure, and changes, modifications, alternatives, and variations can be made in the embodiments without departing from the scope of the present disclosure. The scope of the present disclosure is defined by the claims or the like.

What is claimed is:

1. A decoration component for a mobile terminal, comprising:
    a first decoration enclosure having a first through-hole and a receiving groove surrounding the first through-hole;
    a second decoration enclosure being received in the receiving groove and protruding beyond the receiving groove in an axial direction of the first through-hole, and having a second through-hole corresponding to the first through-hole; and
    a cover being coupled at a side of the second decoration enclosure facing away from the first decoration enclosure, the cover covering the second through-hole,
    wherein the second decoration enclosure comprises:
    a base ring being received in the receiving groove; and
    a connecting protrusion protruding from the base ring towards a groove bottom of the receiving groove, and abutting against the groove bottom of the receiving groove, such that a void is defined by the base ring and the groove bottom of the receiving groove,
    wherein the second decoration enclosure further comprises a fixing ring protruding from the base ring towards the outside of the receiving groove, the fixing ring abuts against a top surface of the first decoration enclosure, and the connecting protrusion is spaced apart from a side wall of the receiving groove and configured to separate the void from the first through-hole.

2. The decoration component according to claim 1, wherein the fixing ring and the base ring together define a fixing groove, and the cover is coupled in the fixing groove.

3. The decoration component according to claim 1, wherein the cover is received in the second through-hole.

4. The decoration component according to claim 1, wherein an outer peripheral surface of the first decoration enclosure is a matte surface, while an outer peripheral surface of the second decoration enclosure is a high glossy surface.

5. A housing component for a mobile terminal, comprising:
a housing having a through hole and a mounting groove surrounding the through hole;
a first decoration enclosure being received in the mounting groove and protruding beyond the mounting groove in an axial direction of the through hole, the first decoration enclosure having a first through-hole corresponding to the through hole; and
a second decoration enclosure being coupled to the first decoration enclosure and having a second through-hole corresponding to the first through-hole,
wherein the second decoration enclosure comprises:
a base ring being received in the receiving groove; and
a connecting protrusion protruding from the base ring towards a groove bottom of the receiving groove, and abutting against the groove bottom of the receiving groove, such that a void is defined by the base ring and the groove bottom of the receiving groove,
wherein the second decoration enclosure further comprises a fixing ring protruding from the base ring towards the outside of the receiving groove, the fixing ring abuts against a top surface of the first decoration enclosure, and the connecting protrusion is spaced apart from a side wall of the receiving groove and configured to separate the void from the first through-hole.

6. The housing component according to claim 5, wherein two through holes, two first through-holes, and two second through-holes are provided, the housing comprises a reinforcing plate configured to separate the two through holes, and the first decoration enclosure rests against the reinforcing plate.

7. The housing component according to claim 6, wherein the first decoration enclosure comprises a first partition plate, the first partition plate separates the two first through-holes, and the first partition plate is coupled with the reinforcing plate;
the second decoration enclosure comprises a second partition plate, the second partition plate separates the two second through-holes, and the second partition plate is coupled with the first partition plate.

8. The housing component according to claim 5, wherein the first decoration enclosure comprises a bottom surface and a mounting protrusion protruding from the bottom surface, the bottom surface is a surface of the first decoration enclosure away from the second decoration enclosure, and the mounting protrusion abuts against a bottom of the mounting groove, such that a gap is defined by the bottom surface and the bottom of the mounting groove.

9. The housing component according to claim 8, wherein the mounting protrusion abuts against a side wall of the mounting groove.

10. The housing component according to claim 8, wherein the housing comprises an outer surface and an inner surface, the through hole runs through the outer surface and the inner surface, the outer surface is closer to the second decoration enclosure than the inner surface,
the first decoration enclosure further comprises a sealing protrusion, the sealing protrusion extends from an outer peripheral surface of the first decoration enclosure, and the sealing protrusion abuts against the outer surface of the housing, and
the mounting protrusion is spaced apart from a side wall of the mounting groove and configured to separate the gap from the through hole.

11. The housing component according to claim 5, wherein the first decoration enclosure comprises a top surface and a receiving groove defined in the top surface, and the top surface is a surface of the first decoration enclosure away from the housing, and
the second decoration enclosure is received in the receiving groove and protrudes beyond the receiving groove in an axial direction of the first through-hole.

12. A mobile terminal, comprising:
a housing having a through hole and a mounting groove surrounding the through hole;
a first decoration enclosure being arranged in the mounting groove and protruding beyond the mounting groove in an axial direction of the through hole, the first decoration enclosure having a first through-hole aligned with the through hole;
a second decoration enclosure being coupled to the first decoration enclosure and having a second through-hole aligned with the first through-hole; and
a camera module being arranged in the through hole and having an optical axis coinciding with an axis of the through hole,
wherein the second decoration enclosure comprises:
a base ring being received in the receiving groove; and
a connecting protrusion protruding from the base ring towards a groove bottom of the receiving groove, and abutting against the groove bottom of the receiving groove, such that a void is defined by the base ring and the groove bottom of the receiving groove,
wherein the second decoration enclosure further comprises a fixing ring protruding from the base ring towards the outside of the receiving groove, the fixing ring abuts against a top surface of the first decoration enclosure, and the connecting protrusion is spaced apart from a side wall of the receiving groove and configured to separate the void from the first through-hole.

* * * * *